United States Patent
Sipman et al.

(10) Patent No.: US 6,889,325 B1
(45) Date of Patent: May 3, 2005

(54) TRANSACTION METHOD AND SYSTEM FOR DATA NETWORKS, LIKE INTERNET

(75) Inventors: Wilhelmus H. M. Sipman, Schalkhaar (NL); Scott MacDonald Ward, Aerdenhout (NL)

(73) Assignee: Unicate BV, DC Naarden (NL)

( * ) Notice: Subject to any disclaimer, the term of this patent is extended or adjusted under 35 U.S.C. 154(b) by 0 days.

(21) Appl. No.: 09/561,351

(22) Filed: Apr. 28, 2000

(30) Foreign Application Priority Data

Apr. 28, 1999 (EP) .......................................... 99201334

(51) Int. Cl.[7] ................................................ H04L 9/00
(52) U.S. Cl. ........................ 713/176; 713/201; 380/37; 380/268
(58) Field of Search ................................ 713/176, 201, 713/170; 380/268, 37; 705/57

(56) References Cited

U.S. PATENT DOCUMENTS

| | | | |
|---|---|---|---|
| 4,962,531 A | * 10/1990 | Sipman et al. ................. | 705/65 |
| 5,068,894 A | * 11/1991 | Hoppe ........................ | 713/172 |
| 5,199,073 A | * 3/1993 | Scott ......................... | 711/216 |
| 5,684,950 A | 11/1997 | Dare et al. | |
| 5,706,427 A | 1/1998 | Tabuki | |
| 5,740,276 A | * 4/1998 | Tomko et al. ............... | 382/210 |
| 5,757,917 A | 5/1998 | Rose et al. | |
| 5,826,241 A | 10/1998 | Stein et al. | |
| 5,987,140 A | * 11/1999 | Rowney et al. ............... | 705/79 |
| 6,047,268 A | * 4/2000 | Bartoli et al. ................. | 705/35 |

FOREIGN PATENT DOCUMENTS

WO  WO 99/00958  1/1999

* cited by examiner

*Primary Examiner*—Justin T. Darrow
*Assistant Examiner*—Kambiz Zand
(74) *Attorney, Agent, or Firm*—Barry L. Davison; Davis Wright Tremaine LLP

(57) ABSTRACT

A method and a system for performing a transaction between at least one first party and at least one second party are disclosed. A data network connects data input/output terminals of the parties. In the data network, a secure and trusted transaction server is provided, in which a profile of the parties is registered, having a party identifier identifying a particular party, and authentication data for authenticating the party and data sent by the party. The parties communicate with each other through the transaction server by means of various transaction messages, which are digitally signed using a table of random numbers and a hashing operation, wherein the table of random numbers is generated by reading a token.

9 Claims, 12 Drawing Sheets

TRANSACTION METHOD AND SYSTEM FOR DATA NETWORKS, LIKE INTERNET

FIELD OF THE INVENTION

The present invention relates to a transaction system for use with data networks, like intranets, extranets, and Internet. Transactions to be performed may include e-commerce, such as shopping and business-to-business transactions, electronic banking, protected emailing, consulting and amending databases, brokerage, and the like. The invention also relates to the authentication of parties and the transactions exchanged. The invention further relates to the preparation of a confidential message. The invention still further relates to the generation of a digital signature as for use in the transmission of secure information.

BACKGROUND OF THE INVENTION

When using data networks, like Internet, for transactions between parties, that want to exchange information, that want to buy goods, enjoy services or receive information and other parties offering those goods, services or information, one of the problems observed is the lack or secure and at the same time simple transaction methods. Secure systems, such as SET, SSL, etcetera exist, but are felt as being cumbersome to use, involving heavy message traffic, (complex) cryptographic procedures, and key management including key recovery.

SUMMARY OF THE INVENTION

An object of the invention is to provide a secure data network transaction system without the need for cryptography, whilst fulfilling demands for security, particularly privacy, authentication and irrefutability of the messages that constitute a transaction.

The privacy requirements are that no information is disclosed to any party, unless needed to perform the basic objective, which within the scope of this invention comprises the execution of a transaction, with or without a payment that might result from the transaction.

The authentication requirements are to be able to verify the authenticity of transmitted data and the sender of those data. Within the scope of this invention these data, as well as an identification of the parties concerned, form part of transaction messages.

The basis of the invention is to use a secure and trusted computer environment, referred hereinafter as the transaction server. Parties wishing to use the services of the transaction server, are registered at the server with a so called profile. Such profile contains at least the data necessary to provide data integrity, data authentication, authentication of the parties, confidentiality or sensitive data (privacy) and irrefutability.

In such an environment, there will be two types of parties:
a party that demands a service, a product, or information, further referred to as a "customer"; and
a party that offers such services, products, or information, further referred to as a "supplier".

In case the transaction involves a payment, a third type of party may occur: one or more financial institutions that take care of the payment process, further referred to as a "financial institution". In the system according to the invention, the number of customers, suppliers and/or financial institutions may range from 1 to many. One or more of the objects of the invention are reached by a method for performing at least one transaction between at least one first party and at least one second party using at least one data network for interconnecting data input/output devices of the at least one first party and the at least one second party, the method comprising:

(a) providing a transaction server in the at least one data network;

(b) in the transaction server, registering a profile of the at least one first party and the at least one second party, each profile comprising a party identifier identifying the party, and authentication data for authenticating the party and data sent by the party, the authentication data comprising a table of random data for generating a digital signature;

(c) the first party issuing at least one transaction message to the second party;

(d) in response to the transaction message, the second party issuing a digitally signed transaction confirmation message to the first party;

(e) on the basis of the transaction confirmation message, the first party issuing a digitally signed transaction approval message to the transaction server;

(f) if required by the first or the second party, the transaction server verifying the authenticity of the first party and the second party, and the transaction data, in response to the transaction approval message;

(g) the transaction server issuing a verified transaction approval message to the second party, in case said authenticity verification is required only if the verification is positive, resulting in a verified transaction approval message; and (h) fulfilment of the transaction.

An example of such a transaction is a customer to supplier transaction or a business to business transaction, where a customer or business demands a service, a product, or information.

The invention further discloses a method for performing at least one transaction between at least one first party and at least one second party using at least one data network for interconnecting data input/output devices of the at least one first party and the at least one second party, the method comprising:

(a) providing a transaction server in the at least one data network;

(b) in the transaction server, registering a profile of the at least one first party and the at least one second party, each profile comprising a party identifier indentifying the party, and authentication data for authenticating the party and data sent by the party, the authentication data comprising a table of random data for generating a digital signature;

(c) the first party issuing at least one transaction message to the transaction server;

(d) in response to the transaction message, the transaction server verifying the authenticity of the first party, and the transaction data;

(e) if the verification is positive, the transaction server issuing a verified transaction message to the second party; and (f) the second party and the first party performing the at least one transaction through the transaction server by means of digitally signed messages, the validity of which is verified by the transaction server.

Examples of such a method are brokerage or telebanking, where the first party is a customer, and the second party is a supplier of services.

Use of the invention for sending and retrieving electronic mail is obtained by a method for performing at least one transaction between at least one first party and at least one second party using at least one data network for interconnecting data input/output devices of the at least one first party and the at least one second party, the method comprising:

(a) providing a transaction server in the at least one data network;

(b) in the transaction server, registering a profile of the at least one first party and the at least one second party, each profile comprising a party identifier indentifying the party, and authentication data for authenticating the party and data sent by the party, the authentication data comprising a table of random data for generating a digital signature;

(c) the first party issuing at least one digitally signed transaction message to the transaction server;

(d) in response to the transaction message, the transaction server verifying the authenticity of the first party;

(e) if the verification is positive, the transaction server linking the transaction message to the profile of a second party;

(f) if the second party connects to the transaction server, the transaction server verifying the authenticity of the second party; and (g) if the verification is positive, the transaction server issuing the transaction message to the second party.

Here, the transaction message is an email.

The invention further discloses a method for performing at least one transaction between at least one first party and at least one second party using at least one data network for interconnecting data input/output devices of the at least one first party and the at least one second party, the method comprising:

(a) providing a transaction server in the at least one data network;

(b) in the transaction server, registering a profile of the at least one first party, the profile comprising a party identifier identifying the party, and authentication data for authenticating the party and data sent by the party, the profile further comprising operation identifiers each identifying an operation that is enabled for the party, and is meaningful only between the party and the transaction server;

(c) the first party issuing at least one transaction message to the transaction server;

(d) in response to the transaction message, the transaction server verifying the authenticity of the first party, and the transaction data;

(e) if the verification is positive, the transaction server issuing a verified transaction message to the second party; and (f) the second party and the first party performing the at least one transaction through the transaction server.

Such a method is particularly suitable for a party desiring to gain access to a service provider anonymously. Yet the service provider can be sure that the party is entitled to the requested access.

Instead of using a table of random data for verifying a digital signature, the profile may comprise operation identifiers each identifying an operation which is enabled for the party, and is meaningful only between the party and the transaction server.

In the system according to the invention, the need for encryption is eliminated as there are no sensitive data to be exchanged between customer, supplier and transaction server. The sensitive data are replaced by covert coded data, which are significant only to the sender and receiver of the message, thus respecting the privacy.

The authentication problems are solved by non-cryptographic methods, hence avoiding the problems of key management and the computing power to perform cryptographic operations. Even, when cryptographic digital signatures are used, the authenticity can be more easily established, using the transaction server concept according to the invention.

Additionally, transaction irrefutability is achieved, since every step in the process can be monitored and verified.

If the transaction involves payments, the transaction server does not require any adaptations within the existing payment systems, as it uses transparently the network structures, which are in use today for the processing of electronic payment transactions. This is quite a cost saving factor, as changing anything in these systems is not a trivial operation. At the same time, the use of the transaction server opens new channels for making frequent payments of small amounts of money, as the costs of processing these payments is low.

FURTHER ASPECTS OF THE INVENTION

Having the secure and trusted transaction server, this server may offer other services, like controlled access to services, payment methods based upon pre-authorisation or electronic each, loyalty schemes, etc.

Loyalty schemes can easily be implemented by adding bonus counters to the customer's profile, with the transaction system according to the invention it is possible to add opportunities for 1—1 marketing between various suppliers (like merchants, issuer banks and acquirer banks) and customers. The loyalty scheme is based upon a data file, added to the customers profile, which can be accessed e.g. as an Internet HTML page or similar.

Furthermore, provisions may be made to enable a user to access the facilities, offered through the transaction system, from another device than his base device (i.e. the device which is standard configured for transactions according to the invention).

The invention and its advantages will be more readily appreciated as the same becomes better understood by reference to the following detailed description and considered in connection with the accompanying drawings in which like reference symbols designate like parts.

DESCRIPTION OF THE PREFERRED EMBODIMENTS

Figure 1:
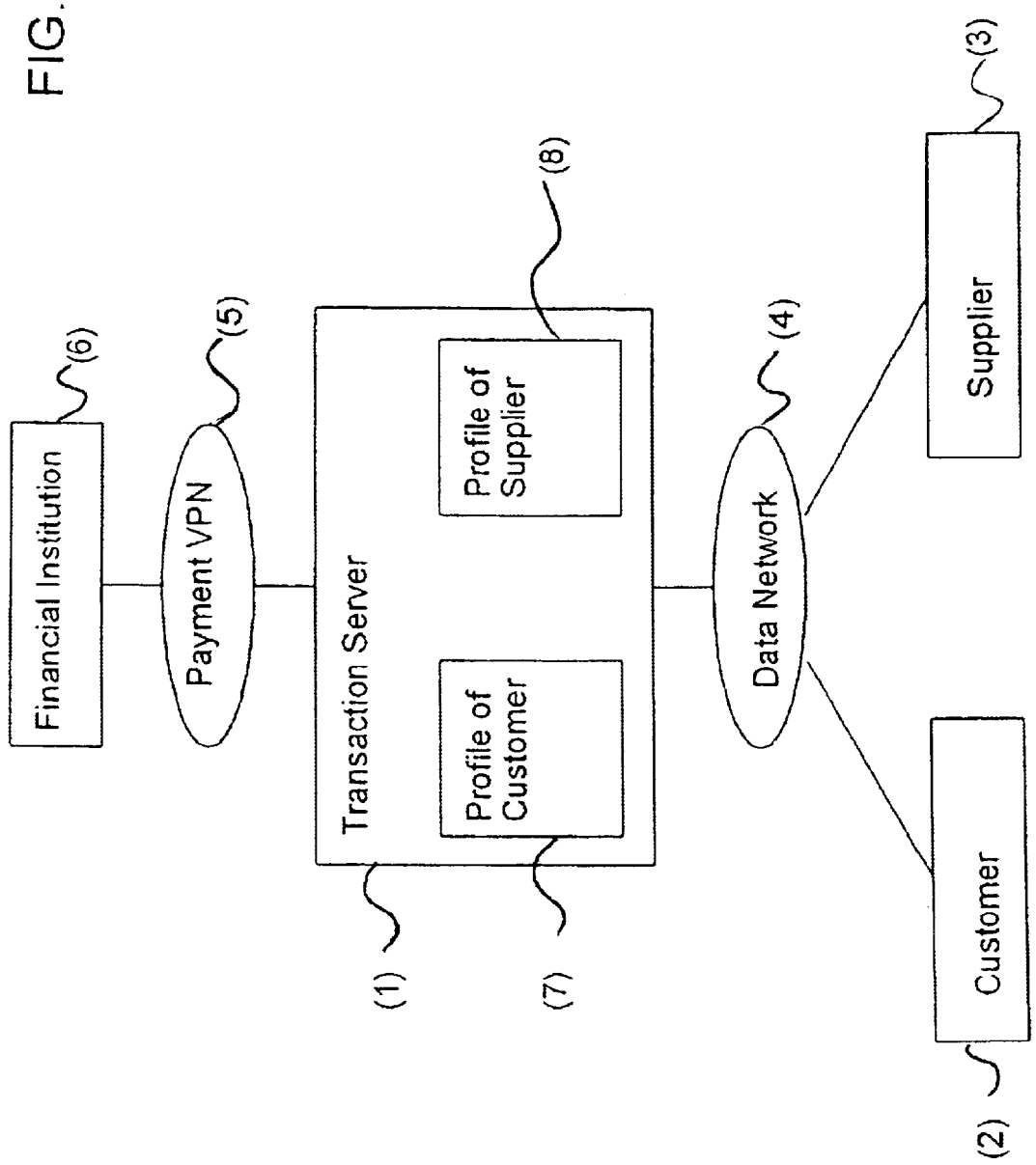
FIG. 1 is a diagram of a transaction system according to the present invention.

FIG. 1 is a diagram of a transaction system in accordance with the invention. Centrally there is a secure and trusted data processing system, hereinafter to be referred to as a transaction server 1, to which participating parties 2, 3 are connected through a data network 4, e.g. Internet. If the transaction involves a payment, the transaction server 1 connects to one or more financial institutions 6, using the existing payment networks 5. The transaction server holds so-called profiles 7 and 8 for the participating parties, as explained below with reference to FIG. 2. "Users" of the transaction system are parties 2 ("Customer") that want to obtain goods, services and/or information from other parties 3 ("Supplier"), who are suppliers of these goods, services and/or information. The parties 2, 3 are selectively coupled to the data network 4.

Financial institutions 6 involved are Issuers (banks issuing payment cards to clients). Acquirers (banks serving the needs for suppliers or goods, services and/or information), and Schemes (financial institutions managing payment cards, like VISA, Mastercard and the like).

Figure 2:
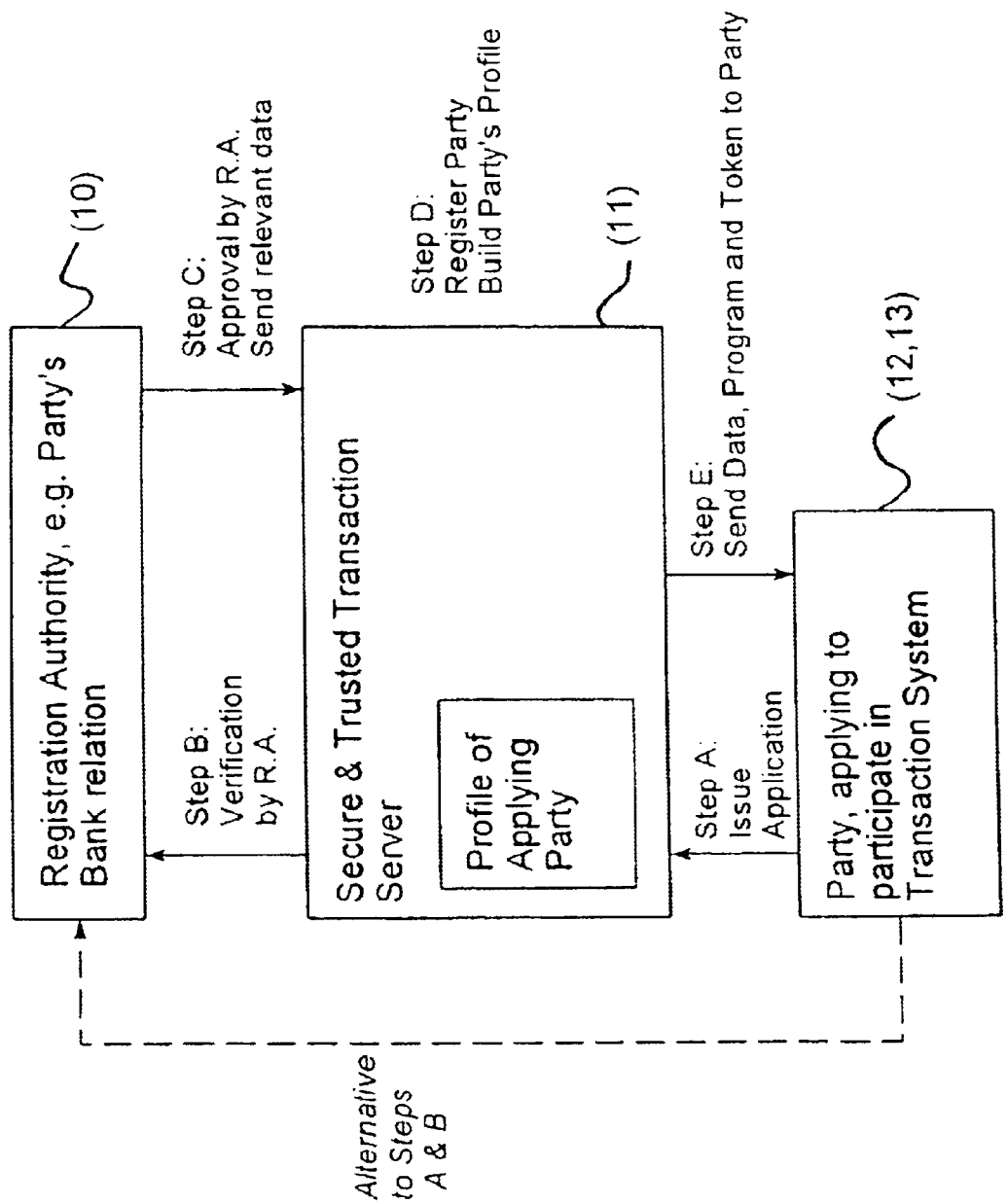
FIG. 2 illustrates how a party applies for participation in the transaction system.

FIG. 2 illustrates how a party 12, 13 will be registered to be able to participate in the transaction system. In Step A the party 12, 13 fills in an application form, containing his request to participate in the transaction system, his identification and (if payment is included in his profile) a list of payment methods (which cards, debit or credit, etc.) he wants to use (if he is a payer/consumer 12) or a list of payment accepting methods (which accounts, etc.) he wants to use (if he is a supplier 13) and an authorisation to the transaction server 11 to verify his account/card data at the corresponding bank and receive additional information, required to create the party's profile. The application fort then is submitted to the institution, operating the transaction server 11, on paper, by E-mail, by courier, or otherwise.

Next, step B, the account/card information together with the identification of the applying party 12, 13 is sent to a Registration Authority 10 (R.A.), e.g. his bank relations) to verify the authenticity of the party 13, 13 and the information supplied with his application.

The request to participate in the transaction system may also directly be addressed to the Registration Authority 10 (the dashed line in FIG. 2).

If the Registration Authority 10 of the party 12, 13 verifies the party positively, i.e. party's identity and other information match, it sends an approval message (Step C) to the organisation operating the transaction server 11. Using the approval message content of Step C in the transaction server 11 a profile for the party will be built, Step D.

Each profile contains at least the party's identification and those other data, which are required to process the transactions as being used.

The profile further may contain data, relevant to a personalized token, which has been or will be issued to the party.

Although cryptography is not required for the invention, still the profile may contain cryptographic keys, to enhance the security of the communication between the transaction server and the party.

The profile may contain a random data string, which acts as a pseudonym for the party identified. The profile further may contain a payment method list, indicating the various payment methods permitted for that party.

Each payment method in the profile may be identified by a random data string.

The profile may contain further data fields for other applications, e.g. electronic cash, loyalty programs, telebanking, stock brokerage, etc.

Finally, in step E, the organisation operating the transaction server 11, which may also be a supplier or a bank, ensures that the party receives a personalised package, required to interface with the transaction system offered, and to be used with the party's data processing system to be coupled to the data networks. The content of this package (data, program and token) mirrors the profile, as registered in the transaction server. Parts of the package may be distributed to the party, using other channels, including electronic means, like electronic mail, or using other suppliers, e.g. a shop, the Registration Authority, or the like.

Figure 3:
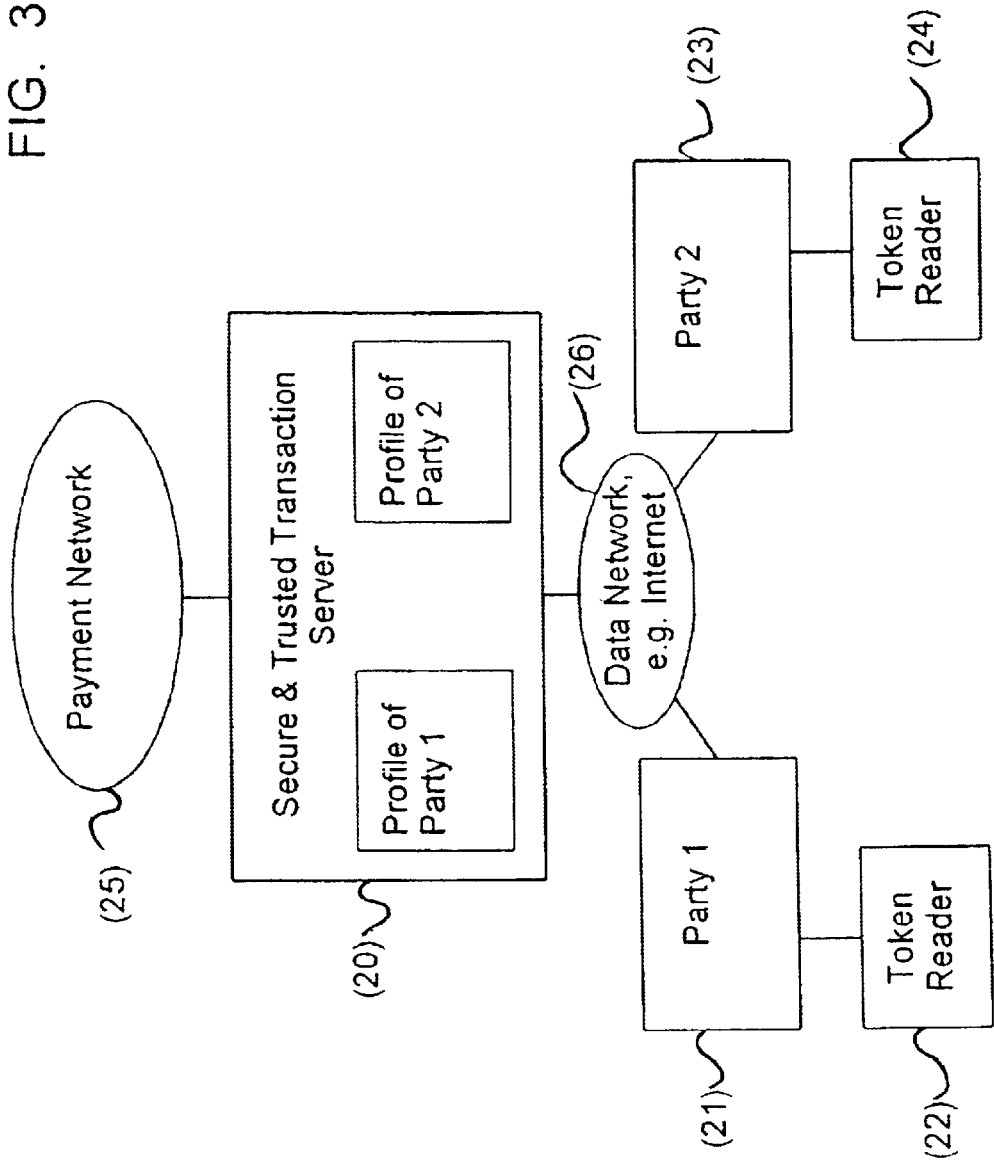
FIG. 3 illustrates the relation between the various functional entities.

In FIG. 3 various entities are indicated.

Parties 21, 23 that want to make use of the transaction system may use a token reader 22, 24. This token reader is used to read the token, required for generating a digital signature of (selected parts of) message(s) in the transaction. Parties communicate through a data network 26, e.g. Internet. A secure and trusted transaction server 20 is also connected to the same data network, in order to receive messages from parties 31, 23. The transaction server 20 processes the transactions, after thorough verification of the validity of the transactions, using the party's profiles, as stored in the transaction server 20. If the transaction involves a payment, the payment process (authorisation and settlement) is handled through the payment network 25, using the procedures that apply for such situations.

When the customer 2 in FIG. 1 wants to perform a transaction from another location than his base location (the location equipped with standard configured/personalized means for performing transactions according to the invention), or otherwise is requested to authenticate himself, this can be achieved by downloading a temporary set of data and program, as depicted in step E in FIG. 2 at the not at base location. A not at base location could be a workstation at the office, a Cybercafe, a PDA (Personal Digital Assistant) with mobile phone function attached, or otherwise, provided that such a system offers access to the data network and is equipped with a token read facility.

As soon as an authentication request is due and the not at base system detects an unknown token (i.e. a token, which is not registered with the token reader, data and program, as referred to in step E of FIG. 2), the user is prompted to enter data, containing the address of the transaction server, his remote ID and, if required, his password. It the token possesses a memory, these data may be obtained from that memory. A message is built, containing the user data entered and provided with a hash and (token based) is signature, similar to the payment order as in (c) of FIG. 9, to be discussed below. The message is now transferred to the transaction server which, after verification of the correctness of the message received and the existence of a profile for that user, will send a temporary set of data and program to the not at base system. Now the not at base system is able to prepare a transaction message, or to authenticate the user, and proceed as normal. Depending of the agreed conditions, the temporary set of data and program will be erased or maintained for a set period.

Figure 4:
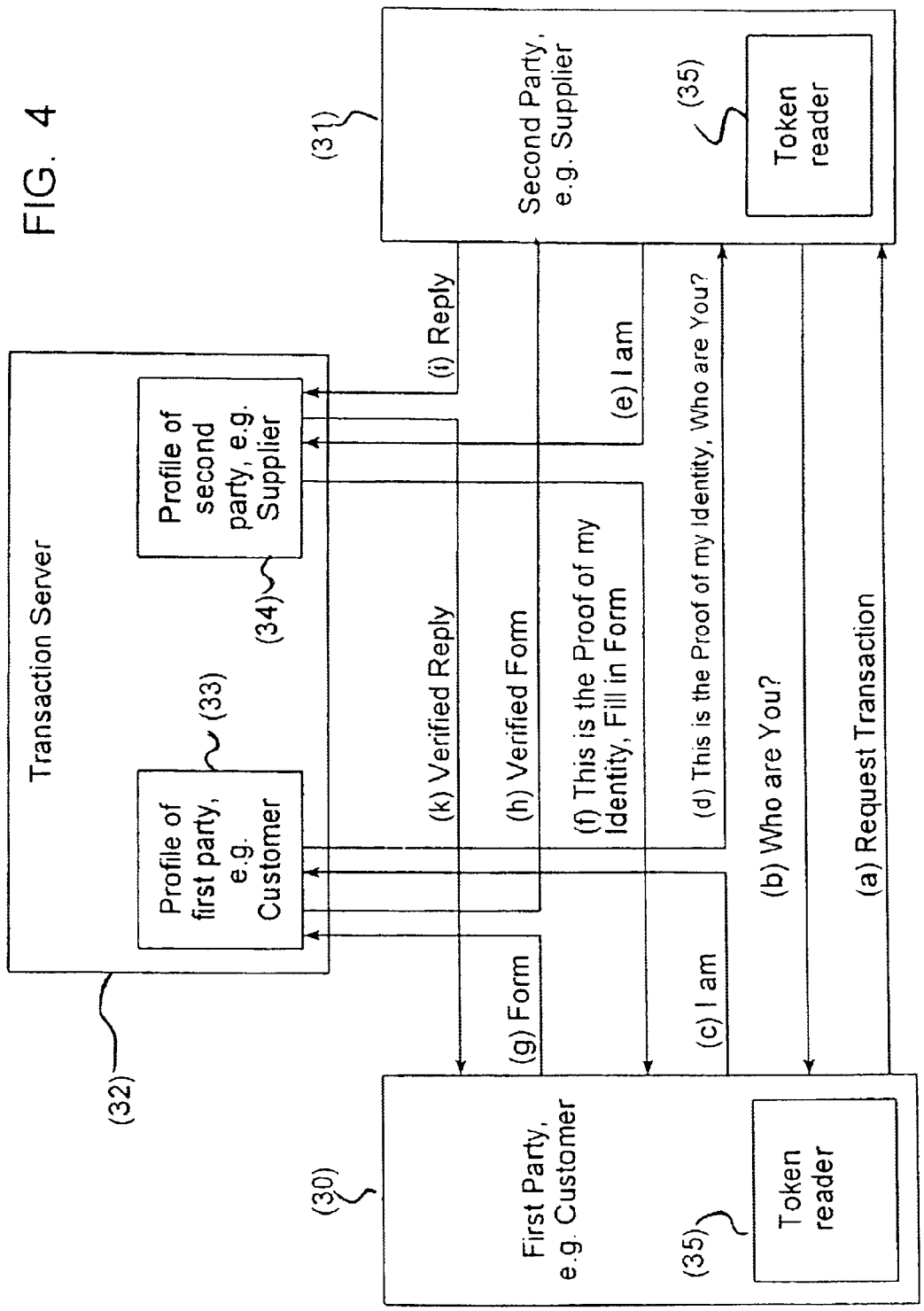
FIG. 4 illustrates the steps in a sample transaction.

FIG. 4 depicts a sample flow for a typical transaction.

(a) A first party 30 and a second party 31 negotiate a transaction. In an Internet environment the first party, e.g. a customer will through his browser visit a site of the second party (e.g. a supplier) and request for a transaction, e.g. purchase goods, buy and sell stock, obtain information, or the like.

(b) The second party may require some proof of identity of the first party. He therefore sends a "Who are You" message to the first party.

(c) The first party adds his identity, as registered in his profile 33 at the transaction server 32 to the "Who are You" message and completes the message with a unique transaction number, a Hash total calculated over the previous data items, and his digital signature. This message ("I am") is then transferred to the transaction server.

(d) The transaction server verifies the message, received from the first party. If the message and the first party are verified positively, the server sends a message to the second party, confirming the identity of the first party and requesting the second party to identify himself.

(e) The second party adds to the message, received from the server, his identity, as registered in his profile 34, a "form" (e.g. a HTML page in case of Internet) in which the first party can fill in the details of his transaction request, a unique transaction number, a Hash total calculated over the previous data items, and his digital signature.

(f) Similar to step (d), the transaction server verifies the message received from the second party and his identity. If verified positively, the form is transferred to the first party.

(g) The first party now fills in the form with the transaction details, as requested, adds a unique transaction number, a Hash total and his digital signature, and sands it to the server.

(h) The server verifies the message and, if verified positively, transfers the filled in form to the second party.

(i) The second party replies to the transaction details, as filled in in the form with a message, completed with a unique transaction number, a Hash total calculated over the previous data items, and his digital signature.

(j) The server verifies the message received, and if verified positively, transfers the reply to the first party.

Steps (g) to (j) may be repeated, if more transactions are to be performed in the same session.

The verification of the messages as in (d), (f), (h) and (j) may be executed on the basis of a risk profile. If the risk profile does not demand immediate verification, the verification may be postponed until a request of either party is received to verify the messages, e.g. in case of a dispute about a certain transaction.

The creation of the digital signature may be performed as described in FIG. 6 below.

Figure 5:
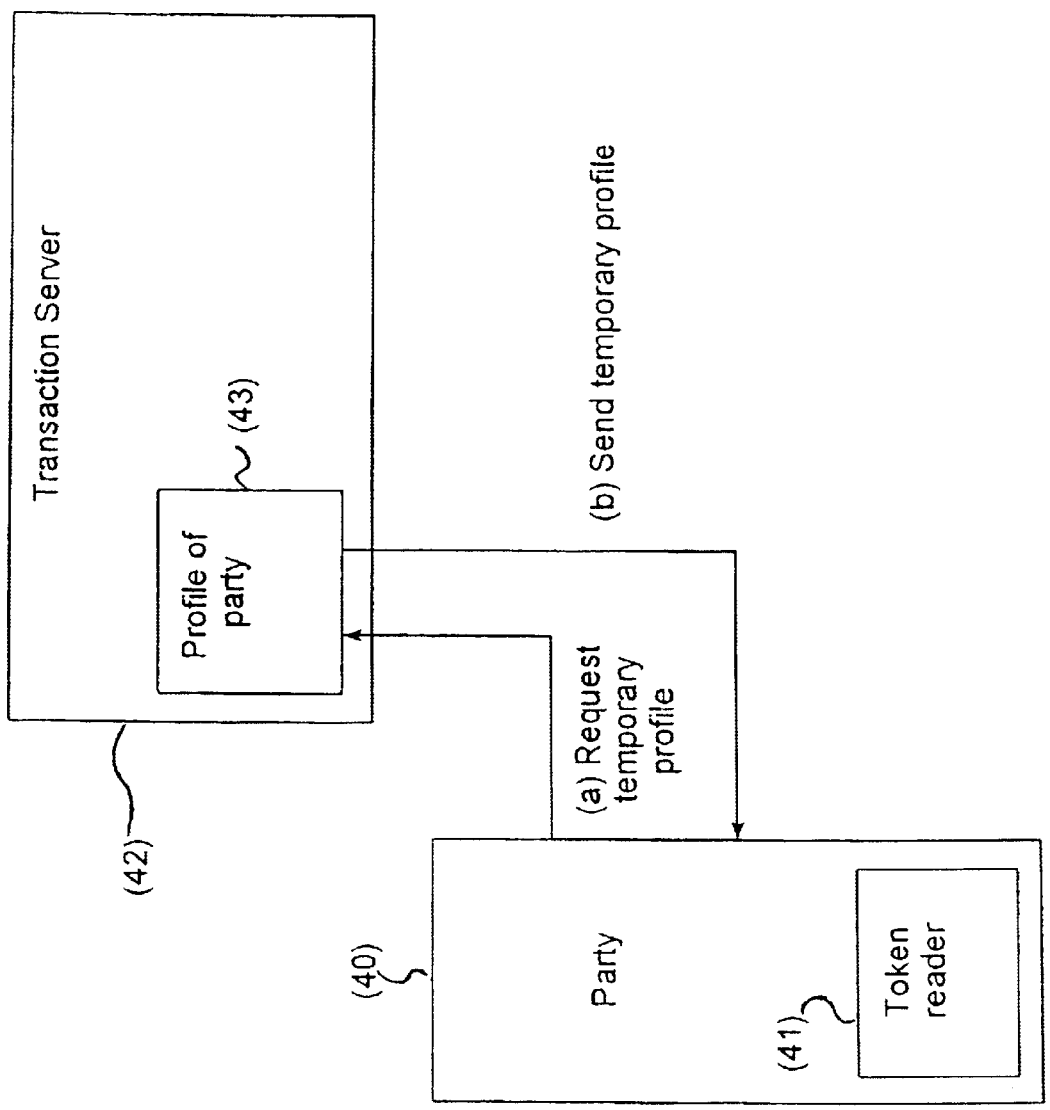
FIG. 5 illustrates how a party can obtain a temporary profile where a party uses a device not personalised for him.

FIG. 5 depicts a sample flow how a party 40 can obtain a temporary profile, if he uses another system than the one, which has been personalised according to step E in FIG. 2.

Where in FIG. 4 step (c) should start, the system detects a token, for which the system has not been personalised.

(a) It therefore sends a request to the server 42 to receive a temporary profile. The message contains at least the server address and a user identification. These data are either collected from the first party's token, using a token reader 41 or entered manually. To enhance the security the message may be provided with a digital signature, generated in the same way as at the payment order. For further security the first party may have to include a Personal Identification Number (PIN) or any other personal identifier. e.g. a password or biometric quality.

(b) After positive verification of the request for a temporary profile, using the party's profile 43, the server returns a message, containing a temporary personalised package, which is in essence the same as in step E of FIG. 2, but may contain certain usage restrictions, like validity period or services granted. The validity period may be one transaction, a limited number of transactions, or an agreed time period, whatever has been agreed at the time the profile has been set up (step D in FIG. 2).

As an additional service, the server may log the full transaction details, to be collected by the first party at a later time, when he connects to the server from the system, which has initially been personalised for using the transaction method described.

Pointer Method

Figure 6:
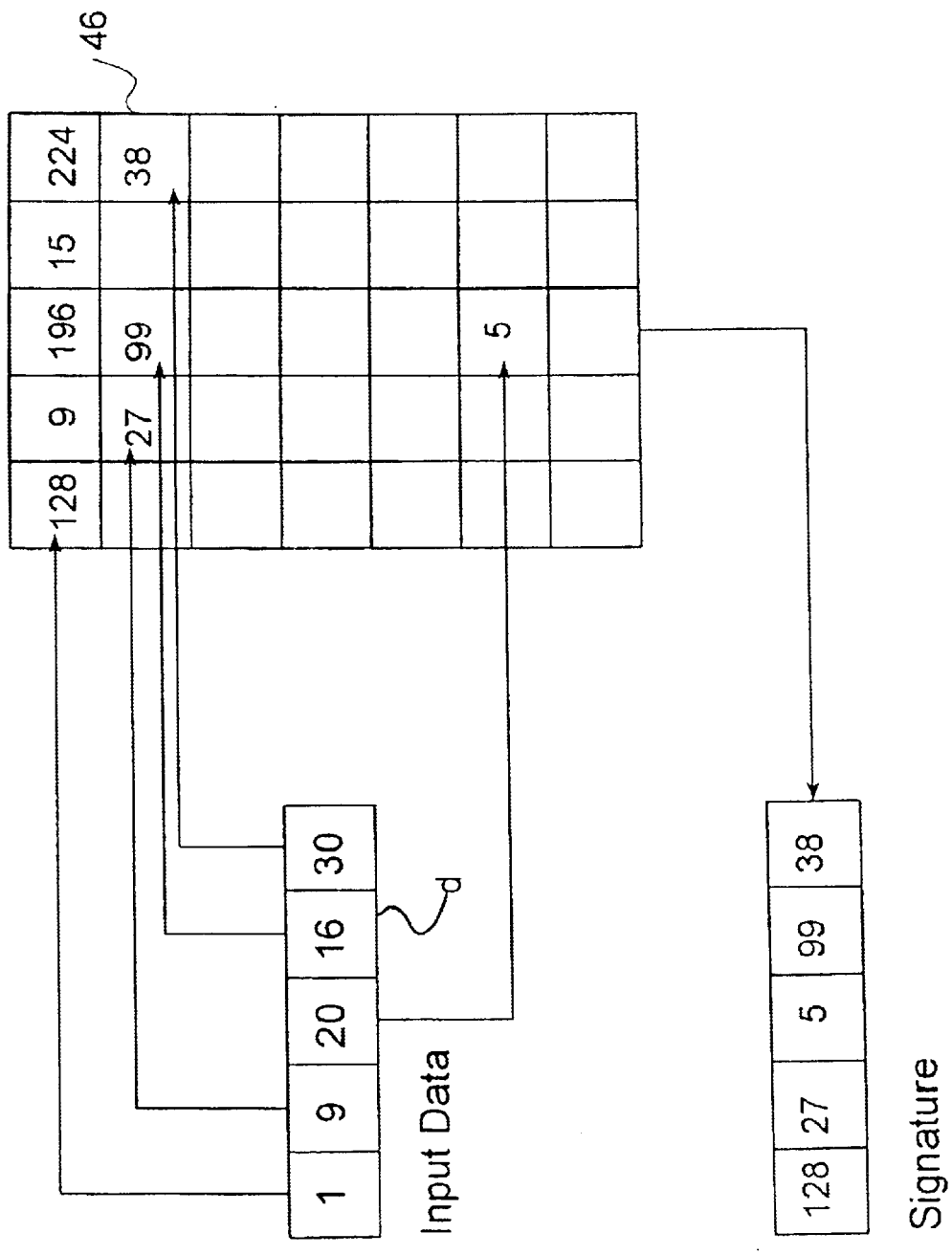
FIG. 6 illustrates the generation of a digital signature used for verifying the authenticity of the data and the sender of those data.

With the pointer method, as depicted in FIG. 6, it is possible to generate an electronic signature over a given set of data.

Assume a table 46 of random numbers. The table 46 may be the read result of a token, e.g. a 3DAS® card. Assume the number of elements in the table 46 equals n. Further assume that each number has a value between 0 and 255.

Assume the defined length of the signature is m bytes, where m is smaller than n.

In the example, depicted in FIG. 6, n equals 35 and m equals 5. Then an electronic signature over a given set of data D can be calculated:

- compress D, using a hashing technique and/or some other method resulting into d;
- d has the property that it can be split into at least n digits, each representing a value between 1 and m; preferably m is replaced by m', where m' is the largest power of 2 smaller than m. In the example d becomes the string: 1, 9, 20, 16, 30;
- identify the elements in the table of random numbers with the values 1 to m. In the example the elements are numbered column by column, starting at the top;
- the digital signature now is the string of values of the elements taken from the random table, identified by the values in d. In the example the digital signature becomes the string: 128, 27, 5, 99, 38.

Figure 7:
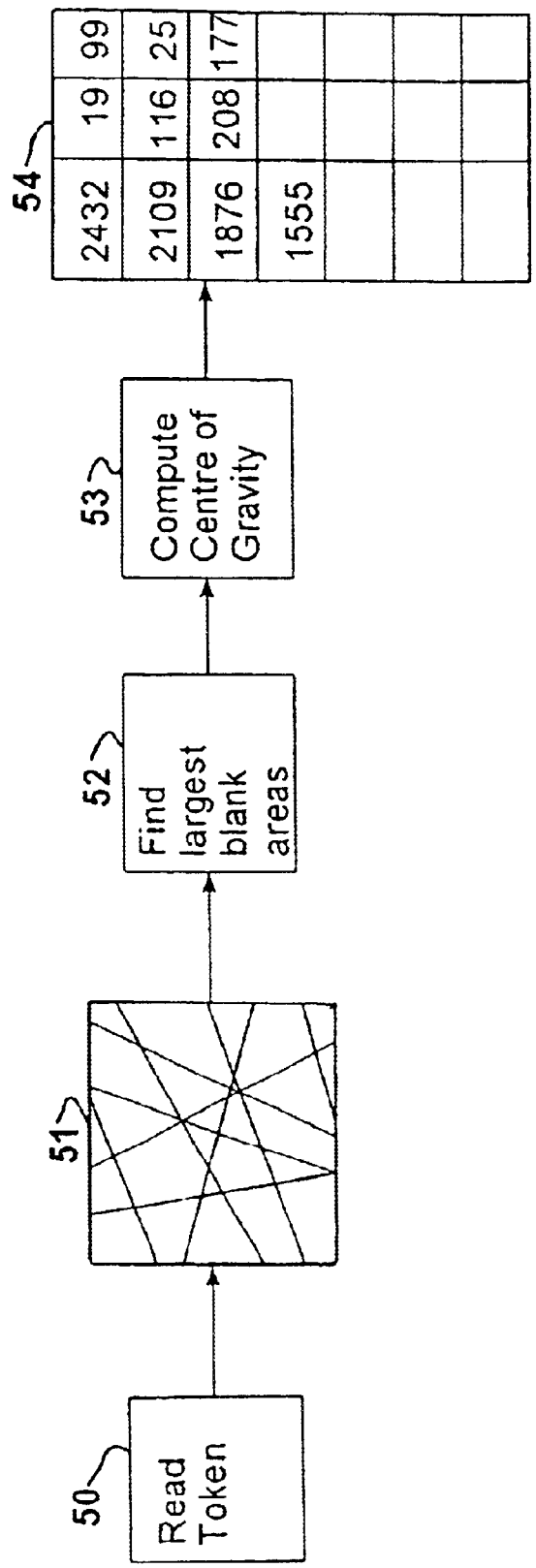
FIG. 7 illustrates how a random structure can be used to generate a table of random numbers.

FIG. 7 illustrates how a table of random numbers may be generated, using a material with a random structure.

Assume a token (e.g. a credit card), which is provided with a random two dimensional or three dimensional structure (e.g. a 3DAS® card).

The taken is inserted in a token reader 50. In the token reader 50 an image is taken from the random structure in the token, which is in the case of a 3DAS® card an image as the sample image 51. In the image empty spaces are visible between the mapping of the random structure as blank areas. The areas are measured, and the n largest areas are selected (52). For each of the selected areas its centre of Gravity (CoG) is calculated as a pair of coordinates (53). A table 54 now is filled with the sizes (first column of the table) and the corresponding coordinates of the CoG (second and third columns of the table). As the original material used is random, also the values in the table 54 are random.

Referring again to FIG. 1, the customer is indicated with 2 and the supplier with 3. The customer profile may contain, as earlier indicated, among others the account/card related data and data fields for other applications, e.g. electronic cash, loyalty programs, electronic banking, stock brokerage, etc. To enable 1—1 marketing a further data file is added. It should be noted, that all the information, stored in the customer profile is present with the customer's agreement, as he did sign up for the transaction solution described.

Upon given criteria, any of the parties 2, 3 and 6 may leave a message in the data file, destined for one of the other parties. This message is stored in the format, applicable for the is network solution chosen, through which the customer communicates with the transaction server. In case of Internet this will be an HTML page or the like.

As soon as the destination party connects to the transaction server and the party's authenticity has been established, he will be prompted by the transaction server that a message is present for him. The party may neglect the prompt or decide to read the message. The message itself may link to other messages, stored elsewhere in the data network (e.g. Internet).

E.g., if an acquirer wants to make an offer to the customer, the message may contain links to the acquirer's website, containing further information. As an example, an acquirer may offer extra bonus miles if the customer selects Mastercard as payment method for paying an international flight, the message then could be an HTML page: 'Dear customer, you may earn extra bonus miles if you pay your international flight, using your Mastercard. If you are interested, visit our website at www.Acquirer.com'. If the customer is interested, he just clicks the website's reference and can access all the relevant data on how to obtain the extra bonus miles and the conditions.

The criteria, used to add a message to the customer profile, may refer to general attributes, belonging to the profile, e.g. which payment methods are enabled for that customer, or refer to specific attributes. e.g. the current transaction, his collected bonus etc.

If a first party wishes to send a message to a second party based upon a given selection criterion, applicable to such second party, the first party sends the message together with the selection criterion to the transaction server. The transaction server now selects all second parties, that match the criterion and adds to their profiles a data file, containing the message concerned, or if such data file already exists, adds the message to that data file. The criterion may include a validity time, i.e. a time within which this criterion should be applied. In that case the transaction is server will monitor changes in the second party's profile. If ouch a change might result in that the second party meets the criterion, the message is added to his profile as described above. As an example, an issuer may offer a special financing arrangement to any customer buying a car during a given month. The criterion is a customer buying a car. The validity time is the given month. As soon as the transaction server detects a transaction, in which a customer is buying a car (or might be expected to do so, based upon the supplier's profile, i.e. the supplier is a car seller), the transaction server adds the message to the customer's profile and prompts the customer that there is a message for him.

When applying this method the privacy of the customer is guaranteed, no information is disclosed to (in the example) the issuer, unless the customer decides to contact the issuer and apply for the special financing arrangement.

Figure 8:
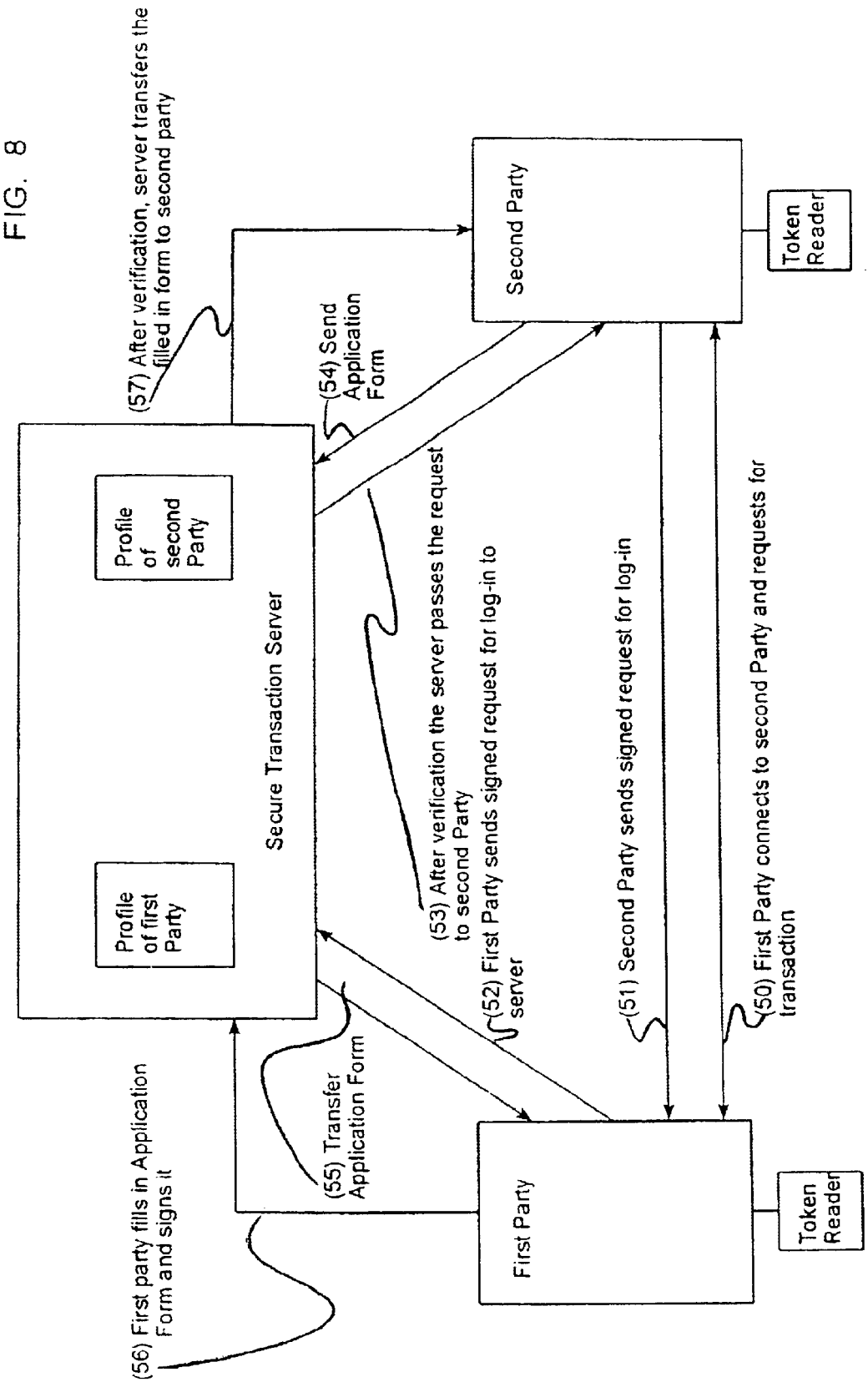
FIG. 8 illustrates steps in a sample transaction between parties.
Figure 9:
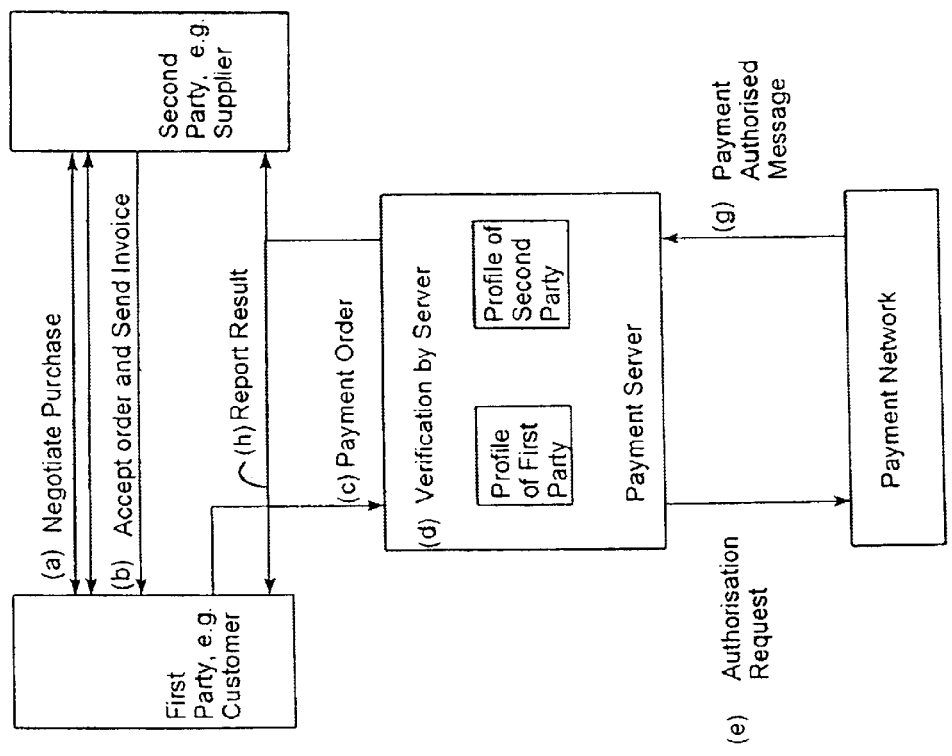
FIG. 9 illustrates a transaction, involving a direct payment.

If no direct payment is involved between a first and a second party, FIG. 8 shows how the transaction will be protected, whereby the authentication of both parties, the transaction messages and the irrefutability of the transaction can be guaranteed, using the same mechanisms as described hereafter with reference to FIG. 9. The first party is the one, requesting a service. The first party may be a consumer, but also a professional (as in business to business electronic commerce, B2B). The second party is the supplier of the requested services.

In step (50) the first party visits a site of the second party and indicates his desire to perform a certain kind of transaction. The second party sends a signed request for log-in to the first party (51), whereby his signature is generated similarly to the invoice message as in step (b) of FIG. 9 to be described hereafter.

The first party processes the log-in request (52) similar to preparing a payment order, as in step (c) of FIG. 9 and transmits the message to a secure transaction server.

The server verifies the message form step (52), using the profiles of both parties. If verification is positive, the server passes the log-in data to second party (53).

The second party checks the authorisation of the first party to perform the requested transaction and returns a signed application form (54) to the server. The application form is a data file (e.g. an HTML page) the first party can use to enter the transaction data. The server verifies the validity of the application form and transfers it to the first party ($5).

The first party fills in the application form and signs it similar to the payment order message as in step (c) of FIG. 9. The form is then transmitted (56) to the server.

After verification by the server (57) the application form is passed to the second party, to be further processed.

Steps (54) to (57) may be repeated, depending on the context of the transaction.

Authenticity of the parties, the transaction and its irrefutability are thus guaranteed by the secure transaction server.

FIG. 9 depicts a sample flow for a typical transaction involving a payment (a) A first and a second party negotiate a purchase. In an Internet environment the first party, e.g. a consumer will through his browser visit a site of the second party (e.g. a merchant) and pursue a normal electronic shopping process by picking goods and storing them in a so-called shopping basket. When he has completed the shopping process, he sends a buying order to the second party.

(b) If the second party accepts the order, he will prepare an invoice message and transmit this to the first party.

The invoice message contains: an identification of the second party, a content of the sale, an amount due, a payment accepting method, a unique transaction number, a Hash total (HashM) calculated over the previous data items, and a digital signature of the second party, calculated over HashM, as exemplified below.

The identification of the second party may be replaced by his pseudonym, as registered at the transaction server, to enhance privacy as his true identity now is covert, without the need for cryptography.

The payment accepting method may be replaced by the random selected key, pointing to the required payment accepting method, as registered in the transaction server, to enhance privacy as his payment accepting method data now are covert, without the need for cryptography.

The digital signature may be generated using a token.

The digital signature may be generated using the pointer method, as elucidated below. The token used in this case may be a 3DAS® object, such as a card, with an optically scannable three-dimensional pattern of randomly overlying fibres, as disclosed in U.S. Pat. Nos. 5,354,097 and 5,719, 939, and Dutch Patent No. 1,000,330, which documents are incorporated herein by reference. The card can be read with an appropriate reading device. This eliminates the need for cryptography.

If a 3DAS® card is used as token, any jitter in the reading of the mark of the card may be used to make the transaction number unique and guarantees at the same time, that the token has been read and processed.

(c) After receiving the invoice, the first party prepares a payment message and transmits this to the transaction server. This message contains: an identification of the first party, a copy of the invoice message, a payment method, a unique transaction number, a Hash total (HashC) calculated over the previous data items, and a digital signature of the first party, calculated over HashC, as exemplified below.

The content of the sale may be deleted from the copy of the invoice message, enhancing privacy by not transmitting this information.

The HashC may be deleted from the payment message.

The identification of the first party may be replaced by his pseudonym, as registered at the transaction server, to enhance privacy as his true identity now is covert, without the need for cryptography.

The payment method may be replaced by a random selected key, pointing to the required payment method, as registered in the transaction server, to enhance privacy as his payment method data now are covert, without the need for cryptography.

The digital signature may be generated using a token.

The digital signature may be generated using the pointer method as elucidated below. The token used in this case may be a card like a 3DAS® card. This eliminates the need for cryptography.

If a 3DAS® card is used as token, the jitter in the reading of the card may be used to make the transaction number unique and guarantees at the same time, that the token has been read and processed.

The digital signature also may include a personal identification, such as a Personal Identification Number (PIN) as is generally used when one wants to withdraw money through an Automated Teller Machine (ATM), a personal identification code or character string, a biometric feature, or any other feature which is strictly personal.

(d) After receiving the payment message, the transaction server starts verifying the message received. Depending on first party's payment method and second party's payment accepting method the authenticity of both parties are verified by the transaction server itself or by a financial institution concerned.

If 3DAS® cards are used as token, the transaction numbers, generated by either party will prove that an actual read has been performed, reducing the chance for counterfeit attacks, such as replay.

(e) Using the information in the first and second party's profiles the transaction server now builds an authorisation request message and/or settlement messages as agreed with the financial institution concerned. In the example of FIG. 9 an authorisation request message is build and transmitted to an acquirer bank (a merchants bank as indicated by his payment accepting method).

(f) If the authorisation for the payment is granted, the financial institution concerned (in the example of FIG. 9 the acquirer bank) will prepare for settlement of the payment transaction.

(g) The financial institution concerned will inform the transaction server whether the payment is authorised.

(h) Finally the transaction server informs both parties about the result of the authorisation.

These messages may contain a random number, which then is used to modify the party's pseudonym and the keys, identifying the payment methods. This will reduce the possibilities for possible attackers to replay a transaction or to act as impostor.

Figure 10:
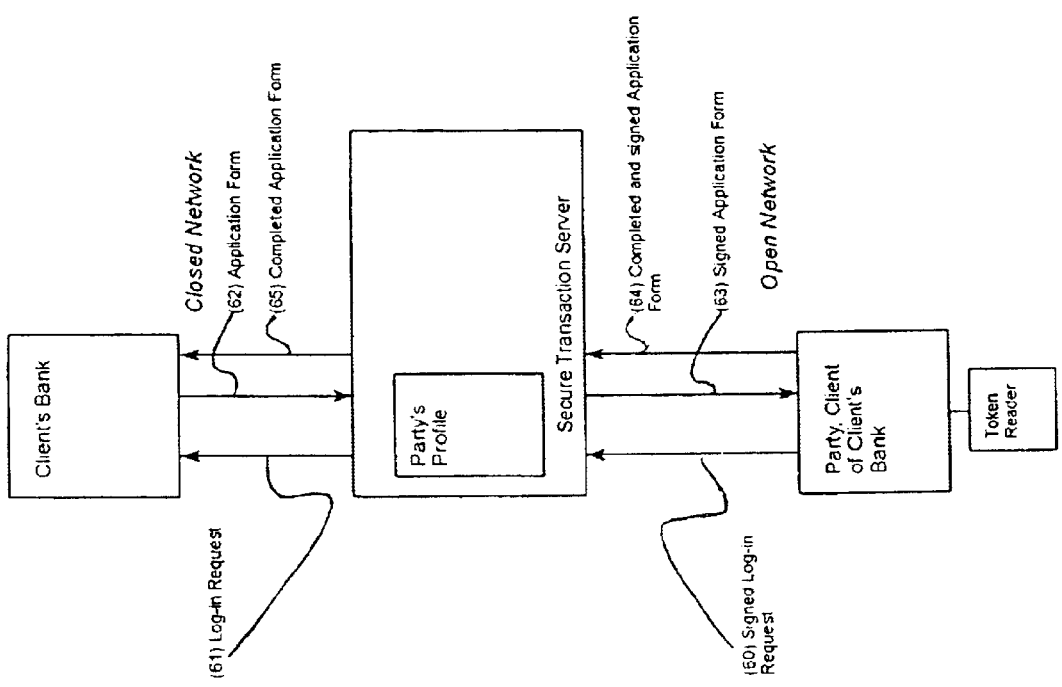
FIG. 10 illustrates a supplier controlled environment, e.g. for electronic banking or brokerage, using the transaction server concept.

In FIG. 10 a configuration for telebanking or electronic banking is described. In this case there is only one party, the client of a bank. The party is via an open network, e.g. Internet, connected to the secure transaction server similar as the situation described in FIG. 1. Similarily the client's bank is connected to the server via a closed network.

(60) When the client wants to perform one or more telebanking transactions, he sends a log-in request to the server, signed and protected in the same way as the payment order message (as (c) in FIG. 4).

(61) The server verifies the authenticity of the client and checks if a relation with the specified bank exists and/or the client is allowed to perform a specific transaction. If so, the log-in request is (via the secure closed network) transmitted to the client's bank. The bank will respond with an Application Form (62), being a data file, where the client can enter the data concerning the transaction requested. This data file may be in case of Internet an HTML page.

(63) The server signs the Application Form and transfers it to the client.

The client completes the Application Form with the transaction data required (64), applying the same protection and signature mechanisms, as used in the payment order as in (c) in FIG. 4 and sends it to the server.

After inspection of the signed Application Form, the server passes it to the client's bank (65).

If required, steps (62) till (65) are repeated, until all transactions are transmitted.

Authenticity of the party, the transactions) and the irrefutability are thus guaranteed by the secure transaction server.

Figure 11:
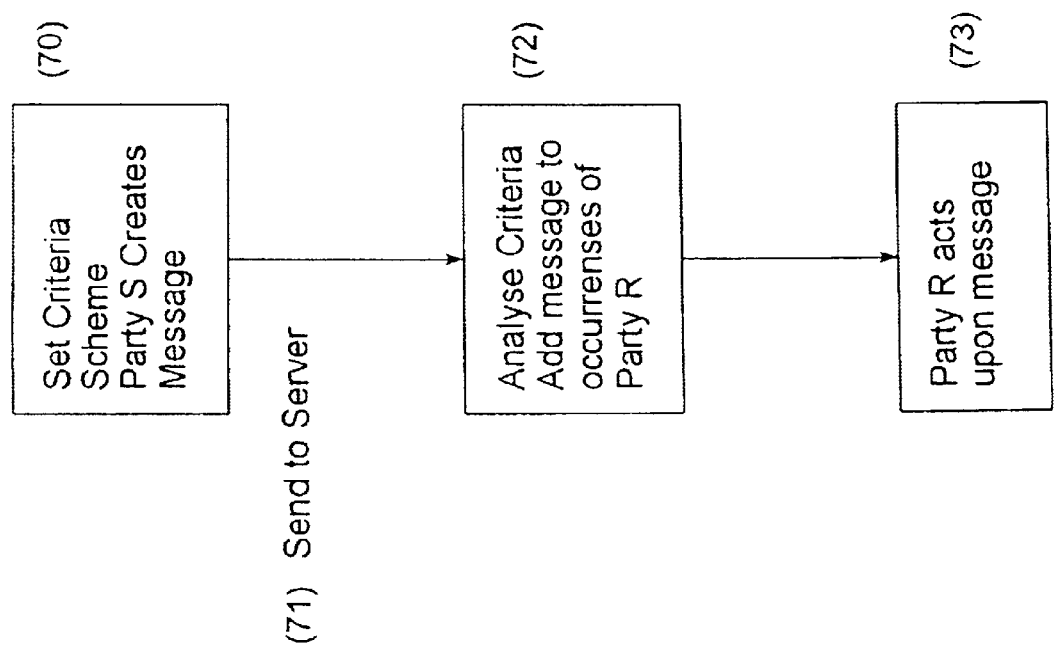
FIG. 11 illustrates steps in exchanging marketing information between parties.

Referring to FIG. 11, parties may exchange marketing information using the profiles (items 1, 8 in FIG, 1), where a party S is the sender and a party R is the receiver of the information. The identity of party R is hidden to party R, unless party R decides to directly contact party S to further investigate the information transmitted to party R. According to a step 70, the party S wants to submit a message to one or more parties R, based upon predefined criteria. For this purpose, party S therefore sets a criteria scheme. This scheme indicates on what basis the one or more parties R have to be addressed, and the time duration of the message to be submitted to the one or more parties R (i.e. Che time period during which the message is valid and may be sent). Furthermore, party S defines the message contents. This message may contain a reference to a special offer and/or references to (in case of Internet) a website of party S.

According to a step 71, party S then sends the criteria scheme and the message to the server. According to a step 72, the server analyses the criteria scheme and selects those one or more parties R, that meet the criteria scheme. If a duration is specified, the server monitors all transaction occurrences of the one or more parties R, to find out if they will fit into the criteria scheme, due to a change in their continuously updated profile. If a transaction occurrence of a party R is found, meeting the criteria scheme, the message is added to his profile together with a "flag", which is an indicator indicating that the criteria scheme is met. According to a step 73, as soon as an occurrence of a party R contacts the server, e.g. by issuing a payment order, and the "flag" is set, the server informs this party R that a message is present. The party R may decide to read the message or to ignore it. If the party R reads the message, he may react to the contents of the message or neglect it.

Figure 12:
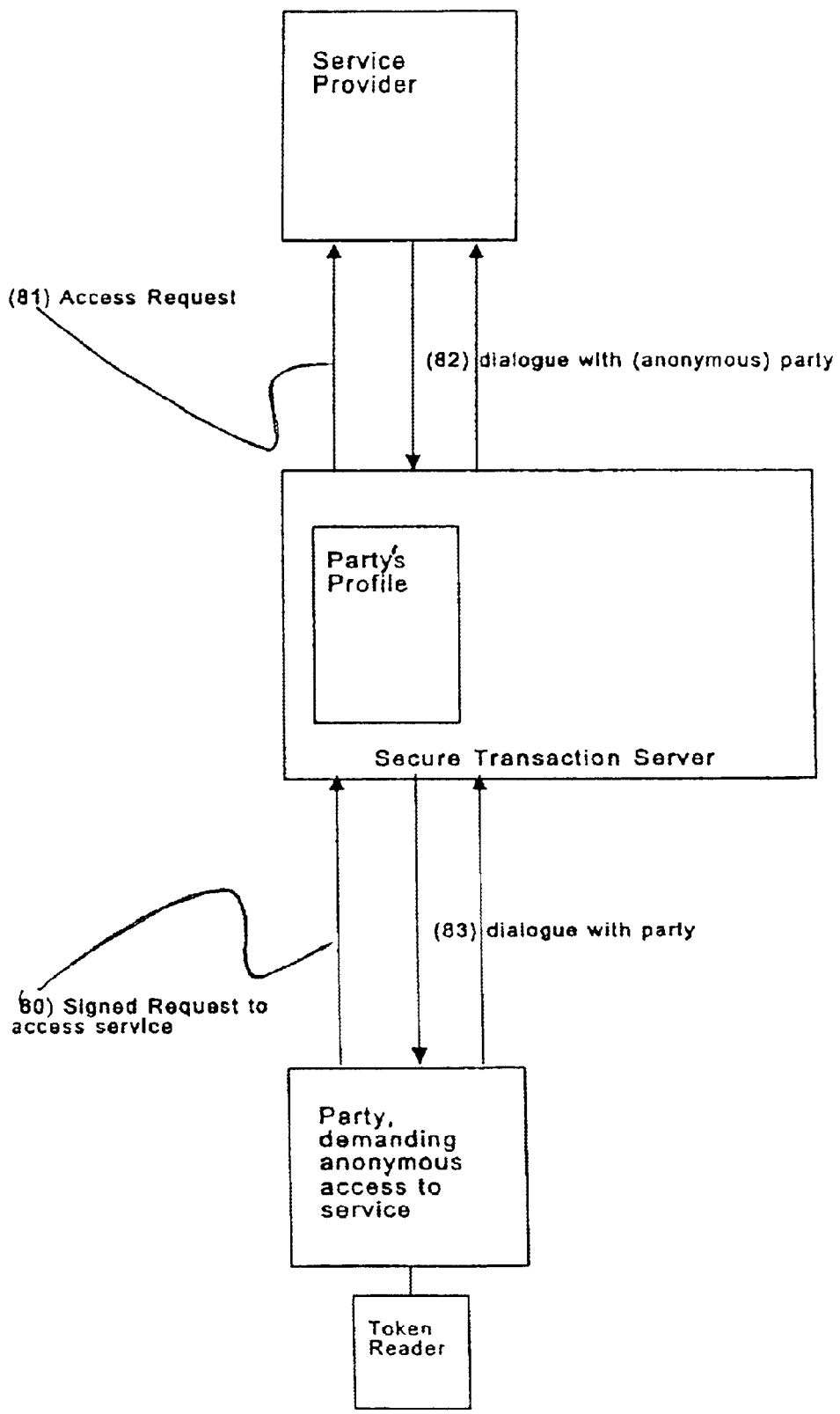
FIG. 12 illustrates steps in accessing a service provider anonymously.

A party may want to access a certain service provider, without disclosing his true identity. The service provider, in turn, may or may not want to be sure that the party is entitled to the requested access. FIG. 12 shows how a party can get anonymous access to a service provider.

In step (80) the party sends a signed request to the secure transaction server to access a certain service provider. The server verifies the identity of the party and, if required, its right to access a requested service, using the party's profile. If the party is verified positively, the server transmits an access request message to the service provider, using a pseudonym for the party. The service provider now knows that the access request is legitimate, since the request originates from the transaction server and starts a dialogue (82) with the (anonymous) party through the server, which transfers the messages to the party (83). At the choice of the party, the party might disclose his true identity to the service provider during this dialogue.

Examples of the Use of the Invention

A consumer wants to buy a book via Internet at an Internet bookseller. He selects the book wanted from the inventory of the bookseller and places an order. The bookseller now prepares a digitally signed invoice message. In this message the bookseller's identity is hidden by the reference to his profile at the transaction server, as is his payment accepting method. As the invoice message arrives at the computer of the consumer, he is prompted with a "pay" request. The consumer now inserts his token in the token reader and selects his method of payment. Next, the program in his computer prepares a payment message to the transaction server. In this message only the data from the invoice message, which are relevant for the payment process, are copied. The identity and selected method of payment are hidden by referring to his profile at the transaction server. The payment message finally is provided with the consumer's digital signature.

The transaction server now can process the payment request in basically three ways.

1. If the payment method selected is a cash payment, the account in the consumer's profile is debited for the amount due, while the account in the bookseller's profile is credited for the same amount. (Note: the cash method is more likely to be used for buying services, like searching a database, or information, like an audio file of the latest top hit).
2. If the payment method selected is a debit or credit transaction, and the transaction server is entitled by the financial institutions concerned to verify the authenticity of the consumer and the bookseller, then a simple authorisation request message or even a settlement request message will be sent to the corresponding financial institution.
3. If the payment method selected in a debit or credit transaction, and the transaction server is not entitled by the financial institutions concerned to verify the authenticity of the consumer and the bookseller, then an authorisation request message is sent to the corresponding financial institution, which then has to verify the authenticity of the consumer and bookseller, and inform the transaction server about the result of the authorisation.

Finally, the transaction server informs the consumer and retailer about the result of the payment order and optionally provides them with a random number, co modify the pointers to their profile data.

The privacy of the payment transaction in the above examples is guaranteed simply by not transmitting privacy sensitive information, but only references to data, already available at the transaction server.

The authentication of the payment transaction and its initiators is done by verifying the digital signatures.

Protection against hacking can be offered by changing the pointer values after each payment transaction, at fixed time intervals or after a given number of transactions.

The software required for implementing the method according to the invention, or one of the features thereof, is recorded on a computer readable medium, such as a floppy disk, a hard disk, a magnetic tape or other suitable media, to make a data processing system execute procedures in accordance with the method or one of the features thereof.

What is claimed is:

1. A method for sending an authenticatable message, containing message data, from a data input/output device of a first party via a data network to a data input/output device of a second party, comprising:

providing a message having message data in the data input/output device of a first party;

providing a table of n random numbers in the data input/output device of the first party, each number having a predetermined position in the table;

splitting the message data into m digits by the input/output device of the first party, the splitting comprising subjecting the message data to a hashing operation to provide a hashing code, and splitting the hashing code into m digits, each digit representing a value between 1 and n, where m is smaller than n;

assembling a digital signature in the input/output device of the first party, wherein the digital signature comprises a string of the random numbers of which the position in the table is indicated by the digits, and wherein the digital signature is validatable by comparison with a registered first party reference profile;

adding the digital signature to the message to form an authenticatable message; and sending, via a data network, the digitally signed message to an input/output device of a second party.

2. The method of claim 1, wherein the table of random numbers is generated by reading a token.

3. The method of claim 1, wherein the table of random numbers is generated by optically scanning geometrical configurations of a randomly shaped two-dimensional or three-dimensional mark, and converting the geometrical configurations into the table of random numbers.

4. The method of claim 1, wherein the digital signature includes a personal identification.

5. A data processing system for generating a digital signature for a message containing message data to be sent via a data network, the system comprising:

a input/output device having a storage device connected thereto for storing a message having message data;

means, operative with the input/output device for providing a table of n random numbers, each having a predetermined position in the table;

means, operative with the input/output device, for splitting dividing the message data into m digits, the splitting means comprising means for subjecting the message data to a hashing operation to provide a hashing code, and means for splitting the hashing code into m digits, each digit representing a value between 1 and n, where m is smaller than n; and means, operative with the input/output device, for assembling a digital signature comprising a string of the random numbers of which the position in the table is indicated by the digits, the signature suitable to be added to the message prior to sending the message over the network.

6. The system of claim 5, wherein the means for providing the table of random numbers comprises a token and a token reader.

7. The system of claim 6, wherein the token is an object provided with an optically scannable randomly shaped, two-dimensional or three-dimensional mark having geometrical configurations, and wherein the system comprises means for converting the geometrical configurations into the table of random numbers.

8. A computer program, comprising program instructions for causing a data processing system to perform its function, wherein the program is stored on a computer readable medium, and wherein the data processing system comprises:

a input/output device having a storage device connected thereto for storing a message having message data;

means, operative with the input/output device for providing a table of n random numbers, each having a predetermined position in the table:

means, operative with the input/output device, for splitting the message data into m digits, wherein the splitting means comprises means for subjecting the message data to a hashing operation to provide a hashing code, and means for splitting the hashing code into m digits, each digit representing a value between 1 and n, where m is smaller than n: and means, operative with the input/output device, for assembling a digital signature comprising a string of the random numbers of which the position in the table is indicated by the digits, the signature suitable to be added to the message prior to sending the message over the network.

9. The computer program of claim 8 stored in a computer memory.

* * * * *